US009145829B2

(12) United States Patent
Hwang et al.

(10) Patent No.: US 9,145,829 B2
(45) Date of Patent: Sep. 29, 2015

(54) TIMING BELT SYSTEM FOR VEHICLE

(71) Applicant: Hyundai Motor Company, Seoul (KR)

(72) Inventors: Yun Sung Hwang, Suwon-Si (KR); Bong Whoa Jeong, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 10 days.

(21) Appl. No.: 14/108,233

(22) Filed: Dec. 16, 2013

(65) Prior Publication Data

US 2015/0005119 A1 Jan. 1, 2015

(30) Foreign Application Priority Data

Jun. 27, 2013 (KR) ........................ 10-2013-0074849

(51) Int. Cl.
*B62J 13/00* (2006.01)
*F16D 1/00* (2006.01)
*F16H 57/02* (2012.01)
*F02B 67/06* (2006.01)

(52) U.S. Cl.
CPC ...................................... *F02B 67/06* (2013.01)

(58) Field of Classification Search
CPC ............. B62J 13/00; B62J 23/00; F16H 7/18; F16P 1/02; F02B 61/02
USPC ................................ 474/144; 123/572, 41.44
See application file for complete search history.

(56) References Cited

U.S. PATENT DOCUMENTS 4,869,708 A * 9/1989 Hoffmann et al. ............ 474/140
5,722,360 A * 3/1998 Tsunoda et al. ........... 123/195 P
6,302,749 B1 * 10/2001 Tawa et al. ...................... 440/76
6,561,154 B2 * 5/2003 Ito et al. .................... 123/195 C
7,704,174 B2 * 4/2010 Takada et al. ................. 474/144
7,918,196 B2 * 4/2011 Ishizaka et al. ............ 123/41.86
7,997,239 B2 * 8/2011 Ishizaka et al. ............ 123/41.86
8,651,093 B2 * 2/2014 Koyamaishi et al. ......... 123/572
2001/0032635 A1 * 10/2001 Kimura ......................... 123/572
2002/0023631 A1 * 2/2002 Ito et al. ........................ 123/572
2002/0042316 A1 * 4/2002 Young et al. .................. 474/140
2004/0005952 A1 * 1/2004 Bachmair ..................... 474/111
2004/0043854 A1 * 3/2004 Fraley, Jr. et al. ............. 474/134
2004/0149242 A1 * 8/2004 Hori et al. .................. 123/41.86
2005/0005921 A1 * 1/2005 Ikeda et al. ................... 123/572
2005/0009653 A1 * 1/2005 Weinstein et al. ............ 474/144
2005/0239591 A1 * 10/2005 Schoenek et al. ............. 474/144

(Continued)

FOREIGN PATENT DOCUMENTS

KR 1999-003209 U 1/1999
KR 2002-0036238 A 5/2002
KR 2003-0000390 A 1/2003

*Primary Examiner* — Henry Liu

(74) *Attorney, Agent, or Firm* — Morgan, Lewis & Bockius LLP

(57) ABSTRACT

A timing belt system for a vehicle may include a camshaft timing gear, a crankshaft timing gear, a timing belt which connects the two timing gears to each other so as to synchronize rotations of the two timing gears, and a tensioner which adjusts tension of the timing belt, may include: a case which has one side formed in an opened container shape, and is provided to cover the crankshaft timing gear, the camshaft timing gear, the timing belt, and the tensioner from a rear side direction; and a front side plate which is formed in a large plate shape, and coupled to the case from a front side direction so as to close one open side of the case, in which a blow-by gas passage, which recirculates blow-by gas, is formed in the case.

8 Claims, 4 Drawing Sheets

(56) References Cited

U.S. PATENT DOCUMENTS

| | | | | |
|---|---|---|---|---|
| 2005/0239592 | A1* | 10/2005 | Schoenek et al. | 474/144 |
| 2005/0272544 | A1* | 12/2005 | Ho | 474/144 |
| 2005/0282670 | A1* | 12/2005 | Kim | 474/144 |
| 2006/0122017 | A1* | 6/2006 | Masuda et al. | 474/144 |
| 2006/0154761 | A1* | 7/2006 | Brown | 474/28 |
| 2006/0160646 | A1* | 7/2006 | Jaszkowiak | 474/144 |
| 2007/0251479 | A1* | 11/2007 | Takada et al. | 123/90.31 |
| 2008/0314676 | A1* | 12/2008 | Ishida | 180/366 |
| 2011/0251003 | A1* | 10/2011 | Nishimiya et al. | 474/144 |

* cited by examiner

TIMING BELT SYSTEM FOR VEHICLE

CROSS-REFERENCE TO RELATED APPLICATION

The present application claims priority to Korean Patent Application No. 10-2013-0074849 filed on Jun. 27, 2013, the entire contents of which is incorporated herein for all purposes by this reference.

BACKGROUND OF THE INVENTION

1. Field of the Invention

The present invention relates to a timing belt system for a vehicle, and more particularly, to a timing belt system for a vehicle which improves durability.

2. Description of Related Art

In general, a timing belt for a vehicle is a wet type belt.

The timing belt is one of the most important components in an engine, and refers to a belt that connects a timing gear mounted on a crankshaft to a timing gear mounted on a camshaft. The timing belt has cogs engaged with the gear, and is also called a tooth-attached belt or a cog belt.

As another apparatus that connects the timing gear of the crankshaft to the timing gear of the camshaft and serves to rotate the camshaft, there is a timing chain. However, the timing chain made of a metal material is heavier than the timing belt made of a rubber material. Therefore, although there is a merit in that the timing chain may be semipermanently used, the timing belt is mainly used to improve fuel efficiency.

The wet type belt refers to a timing belt of which an oil resistance and a thermal resistance are reinforced. The wet type belt is made of a material having a high oil resistance and a high thermal resistance, but causes manufacturing costs to increase. In addition, even in the case of the material having the high oil resistance and the high thermal resistance, because the rubber material has a limitation, long-term durability of the wet type belt may deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a timing belt system for a vehicle capable of reducing production costs of a timing belt and securing durability of the timing belt.

In addition, various aspects of the present invention are directed to providing a timing belt system for a vehicle capable of recirculating blow-by gas.

In an aspect of the present invention, a timing belt system for a vehicle, including a camshaft timing gear, a crankshaft timing gear, a timing belt which connects the two timing gears to each other so as to synchronize rotations of the two timing gears, and a tensioner which adjusts tension of the timing belt, the timing belt system may include a case which may have one side formed in an opened container shape, and is provided to cover the crankshaft timing gear, the camshaft timing gear, the timing belt, and the tensioner from a rear side direction, and a front side plate which is formed in a plate shape, and coupled to the case from a front side direction so as to close one open side of the case, wherein a blow-by gas passage, which recirculates blow-by gas, is formed in the case.

The case may include a rear side plate which is formed to block rear sides of the crankshaft timing gear, the camshaft timing gear, the timing belt, and the tensioner, an outer wall which vertically protrudes from the rear side plate along a circumference of the rear side plate, and an inner wall which vertically protrudes from the rear side plate along the circumference of the rear side plate at a portion relatively further inward from the circumference of the rear side plate than the outer wall.

The crankshaft timing gear, the camshaft timing gear, the timing belt, and the tensioner are disposed in an internal space which is enclosed by the rear side plate, the inner wall, and the front side plate.

A coolant passage, which is enclosed by the rear side plate, the outer wall, the inner wall, and the front side plate, is formed between the outer wall and the inner wall so that a coolant is circulated therethrough.

A coolant inlet through which the coolant flows in, and a coolant outlet through which the coolant is discharged are formed in the coolant passage, wherein a partition wall is formed between the coolant inlet and the coolant outlet so that the coolant is circulated in one direction.

The coolant inlet and the coolant outlet are formed to be adjacent to each other so that the coolant is circulated along an entire circumference of the case, wherein the partition wall is formed to isolate the coolant inlet and the coolant outlet from each other.

The blow-by gas passage is formed along the circumference of the case such that the outer wall vertically protruding from the rear side plate is bent twice, thereby having a U-shaped cross section.

A lower side of the blow-by gas passage is connected to a crank chamber, and an upper side of the blow-by gas passage is connected to an intake manifold such that the blow-by gas flowing into the crank chamber is transmitted to the intake manifold.

A drain hole is formed in the case so that engine oil flowing into a space enclosed by the case and the front side plate is discharged.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
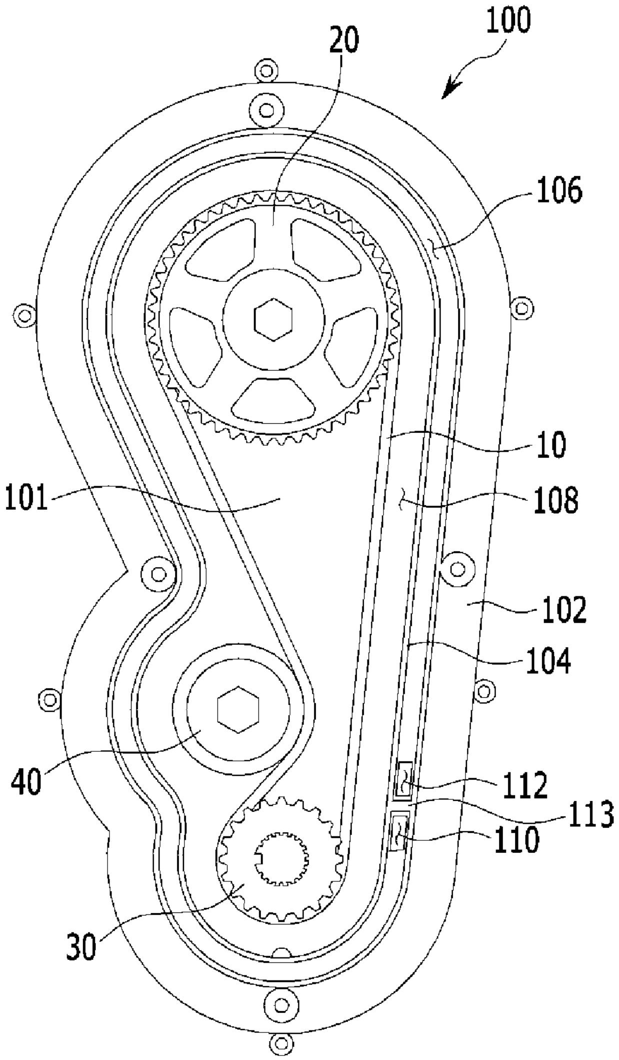
FIG. 1 is a configuration view illustrating an interior of a timing belt system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a configuration view illustrating an interior of a timing belt system for a vehicle according to an exemplary embodiment of the present invention. In addition, FIG. 1 illustrates a front side of the timing belt system for a vehicle.

As illustrated in FIG. 1, the timing belt system for a vehicle according to the exemplary embodiment of the present invention includes a crankshaft timing gear 30, a camshaft timing gear 20, a timing belt 10, a tensioner 40, and a case 100.

The crankshaft timing gear 30 refers to a gear provided on one end of a crankshaft. In addition, the crankshaft timing gear 30 is rotated together with the crankshaft.

The camshaft timing gear 20 refers to a gear provided on one end of a camshaft. In addition, the camshaft timing gear 20 is rotated together with the camshaft.

In general, the crankshaft timing gear 30 and the camshaft timing gear 20 are commonly called timing gears. In addition, the two timing gears 20 and 30 are synchronized with each other by being connected to each other by a chain or a belt. For example, in a four-cycle engine, the camshaft is rotated at a speed half (½) a speed of the crankshaft.

The timing belt 10 refers to a belt that connects the crankshaft timing gear 30 to the camshaft timing gear 20. In addition, an inner surface of the timing belt 20, with which the two timing gears 20 and 30 come into contact, may have cogs so as to be engaged with the two timing gears 20 and 30. Meanwhile, the timing belt 20 is made of a rubber material.

The tensioner 40 is disposed between the crankshaft timing gear 30 and the camshaft timing gear 20. In addition, the tensioner 40 comes into contact with an outer surface of the timing belt 20. Moreover, the tensioner 40 is mounted to push the outer surface of the timing belt 20 inward, and adjusts tension of the timing belt 20. Although FIG. 1 illustrates a pulley-shaped tensioner 40, the present invention is not limited thereto, and a shape and a configuration of the tensioner 40 may be variously changed by a person of an ordinary skill in the art (hereinafter, referred to as a person skilled in the art).

Because the connection relationships among the crankshaft timing gear 30, the camshaft timing gear 20, the timing belt 10, and the tensioner 40 are obvious to a person skilled in the art, a more detailed description thereof will be omitted.

The case 100 is formed in an opened container shape, and provided to enclose the crankshaft timing gear 30, the camshaft timing gear 20, the timing belt 10, and the tensioner 40. In addition, the case 100 prevents engine oil from coming into direct contact with the timing belt 10. Here, one open direction of the case 100 is defined as a front side direction of the timing belt system for a vehicle.

The case 100 includes a rear side plate 101, an outer wall 102, an inner wall 104, a coolant passage 106, an internal space 108, a coolant inlet 110, and a coolant outlet 112.

The rear side plate 101 refers to a large plate formed to block rear sides of the crankshaft timing gear 30, the camshaft timing gear 20, the timing belt 10, and the tensioner 40. The rear side plate 101 may be formed in various shapes in accordance with configurations of the crankshaft timing gear 30, the camshaft timing gear 20, the timing belt 10, and the tensioner 40.

Figure 4:
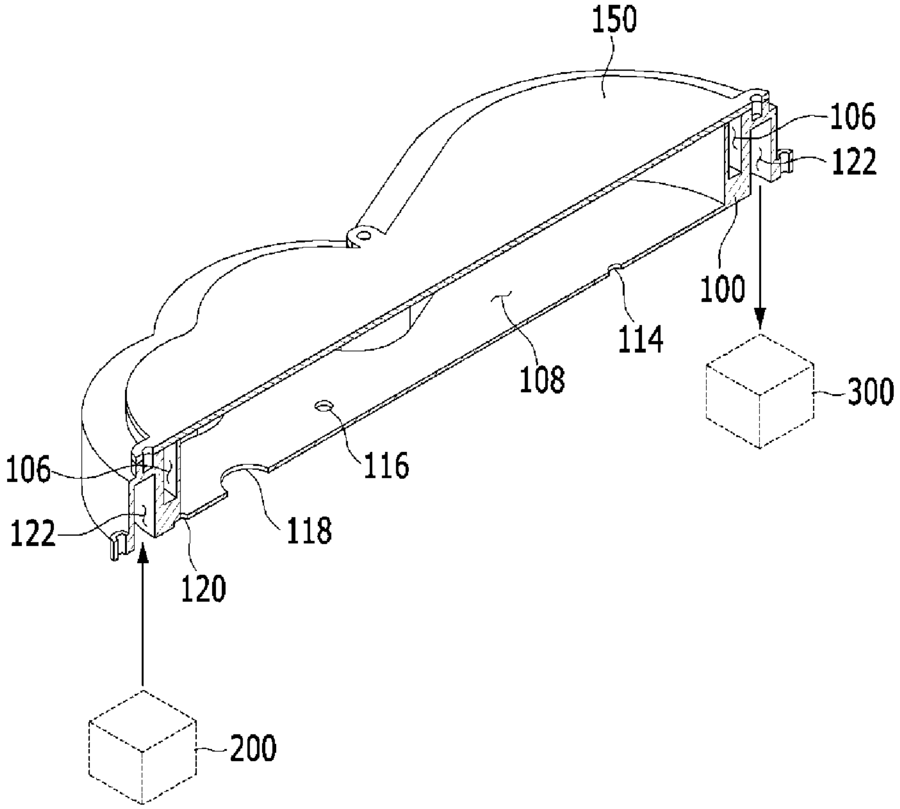
FIG. 4 is a cross-sectional view of the case and the front side plate that are coupled to each other.

The outer wall 102 refers to one wall which vertically protrudes from the rear side plate 101 along a circumference of the rear side plate 101. In addition, the outer wall 102 and the rear side plate 101 form an outer appearance of the case 100. Referring to FIG. 4, the outer wall 102, which protrudes from the rear side plate 101, is formed to have a U-shaped cross section by being bent twice. Therefore, when viewed from the front side illustrated in FIG. 1, the outer wall 102 has a predetermined thickness.

The inner wall 104 refers to another wall which vertically protrudes from the rear side plate 101 along the circumference of the rear side plate 101. In addition, the inner wall 104 is formed at a portion relatively further inward from the circumference of the rear side plate 101 than the outer wall 102. Therefore, a space may be formed between the outer wall 102 and the inner wall 104.

The coolant passage 106 refers to the space formed between the outer wall 102 and the inner wall 104. In addition, the coolant passage 106 is formed so that a coolant is circulated along the circumference of the case 100.

The internal space 108 refers to a space which is enclosed by the rear side plate 101 and the inner wall 104. That is, the internal space 108 is formed inside the inner wall 104, and the crankshaft timing gear 30, the camshaft timing gear 20, the timing belt 10, and the tensioner 40 are disposed in the internal space 108.

The coolant inlet 110 is formed so that the coolant flows into the coolant passage 106 through the coolant inlet 110.

The coolant outlet 112 is formed so that the coolant is discharged from the coolant passage 106 through the coolant outlet 112.

The coolant inlet 110 and the coolant outlet 112 are formed to be adjacent to each other so that the coolant passes through the entire circumference of the case 100 along the coolant passage 106, and a partition wall 113 is formed between the coolant inlet 110 and the coolant outlet 112. That is, the partition wall 113 allows the coolant to be circulated in one direction along the coolant passage 106.

The partition wall 113 protrudes from the rear side plate 101 by a height of the outer wall 102 and inner wall 104, and blocks a portion where the coolant inlet 110 and the coolant outlet 112 are adjacent to each other. That is, the partition wall 113 is formed to isolate the coolant inlet 110 and the coolant outlet 112 from each other.

Here, as the coolant is circulated along the coolant passage 106, the case 100 is cooled, and ultimately, the timing belt 10 is cooled. Therefore, a thermal resistance of the timing belt 10 is reinforced.

Figure 2:
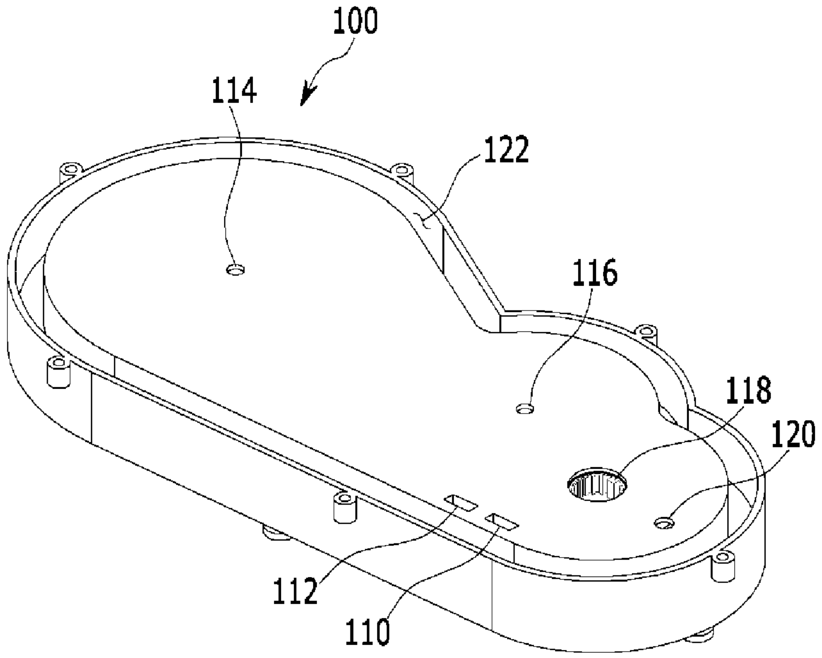
FIG. 2 is a rear side view of the timing belt system for a vehicle according to the exemplary embodiment of the present invention.

FIG. 2 is a rear side view of the timing belt system for a vehicle according to the exemplary embodiment of the present invention.

As illustrated in FIG. 2, a camshaft hole 114, a tensioner hole 116, a crankshaft hole 118, and a drain hole 120 are formed in the rear side plate 101. In addition, the timing belt system for a vehicle according to the exemplary embodiment of the present invention further includes a blow-by gas passage 122.

Meanwhile, although FIGS. 1 and 2 illustrate a configuration in which the coolant inlet 110 and the coolant outlet 112 are formed in the rear side plate 101, the present invention is not limited thereto.

The camshaft hole 114 refers to a hole formed so that the camshaft penetrates the rear side plate 101 so as to be connected to the camshaft timing gear 20.

The tensioner hole 116 refers to a hole formed so that an actuator, which operates the tensioner 40, and the tensioner 40 are connected to each other. Here, the actuator may be mounted in the engine. For example, in the case of the pulley-shaped tensioner 40 illustrated in FIG. 1, a pulley shaft is disposed to penetrate the rear side plate 101 through the tensioner hole 116.

The crankshaft hole 118 refers to a hole formed so that the crankshaft penetrates the rear side plate 101 so as to be connected to the crankshaft timing gear 30.

The drain hole 120 refers to a hole formed so that the engine oil flowing into the case 100 is discharged through the drain hole 120. It is difficult to completely seal the engine oil flowing through the camshaft hole 114, the tensioner hole 116, and the crankshaft hole 118. Therefore, even though an amount of engine oil flowing in through the camshaft hole 114, the tensioner hole 116, and the crankshaft hole 118 is small, the drain hole 120 is formed to discharge the engine oil. Moreover, the drain hole 120 is formed at a lower side of the case 100 so that the engine oil is easily discharged.

Meanwhile, although FIG. 2 illustrates a configuration in which the drain hole 120 is formed in the rear side plate 101, the drain hole 120 may be formed in other portions in the case 100 in accordance with a design made by a person skilled in the art.

The blow-by gas passage 122 is formed by the outer wall 102 which protrudes from the rear side plate 101 and has a U-shaped cross section formed by being bent twice. That is, the blow-by gas passage 122 refers to a space that is enclosed by the U-shaped outer wall 102. Therefore, the blow-by gas passage 122 is formed along the circumference of the case 100. Moreover, the blow-by gas passage 122 is formed so that blow-by gas is circulated.

Here, the blow-by gas refers to gas that leaks and flows into a crank chamber 200 from a combustion chamber of the engine through a portion between a piston and a cylinder. Because the blow-by gas is obvious to a person skilled in the art, a more detailed description thereof will be omitted.

Figure 3:
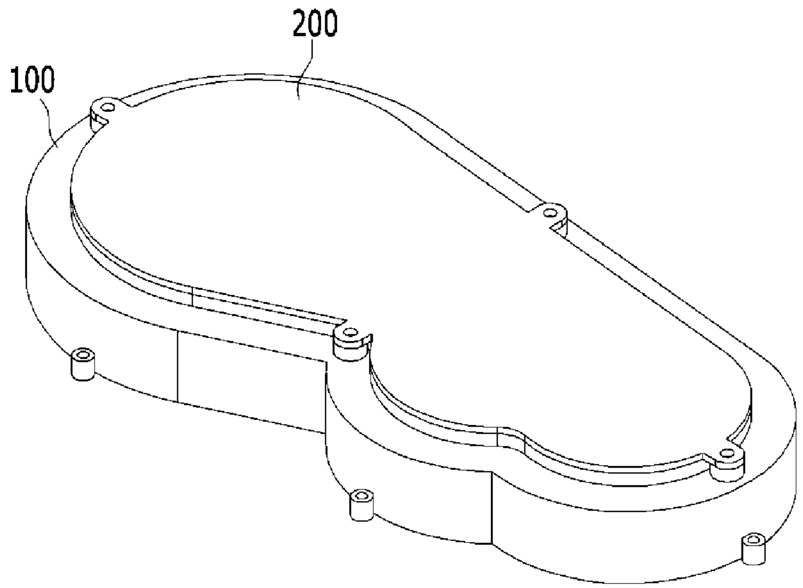
FIG. 3 is a view illustrating a state in which a case and a front side plate of the timing belt system for a vehicle according to the exemplary embodiment of the present invention are coupled to each other.

FIG. 3 is a view illustrating a state in which the case and a front side plate of the timing belt system for a vehicle according to the exemplary embodiment of the present invention are coupled to each other, and FIG. 4 is a cross-sectional view of the case and the front side plate which are coupled to each other.

As illustrated in FIGS. 3 and 4, the timing belt system for a vehicle according to the exemplary embodiment of the present invention further includes a front side plate 150.

The front side plate 150 is formed in a large plate shape, and coupled to the front side of the case 100. In a state in which the front side plate 150 is not coupled to the case 100, the coolant passage 106 and the internal space 108 of the case 100 are opened in a front side direction.

Meanwhile, the front side plate 150 and the case 100 are coupled to each other such that opened front sides of the coolant passage 106 and the internal space 108 are closed. That is, except for the camshaft hole 114, the tensioner hole 116, the crankshaft hole 118, and the drain hole 120, the internal space 108 becomes a closed and sealed space. In addition, except for the coolant inlet 110 and the coolant outlet 112, the coolant passage 106 becomes a closed and sealed space. Therefore, the engine oil is prevented from coming into direct contact with the crankshaft timing gear 30, the camshaft timing gear 20, the timing belt 10, and the tensioner 40.

Referring to FIGS. 2 and 4, the blow-by gas passage 122 is opened in a rear side direction of the case 100. In addition, a rear side of the case 100 is coupled to the engine such that one open side of the blow-by gas passage 122 is closed. Moreover, a lower side of the blow-by gas passage 122 is connected to the crank chamber 200, and an upper side of the blow-by gas passage 122 is connected to an intake manifold 300. Therefore, the blow-by gas flowing into the crank chamber 200 is transmitted to the intake manifold 300 through the blow-by gas passage 122, and supplied back to the combustion chamber. In FIG. 4, the crank chamber 200, the intake manifold 300, and the circulation of the blow-by gas are simply depicted by boxes and arrows.

Here, because the crank chamber 200, the intake manifold 300, and an object of the recirculation of the blow-by gas are obvious to a person skilled in the art, a more detailed description will be omitted.

As described above, according to the exemplary embodiment of the present invention, the contact between the timing belt 10 and the engine oil is minimized, thereby securing durability of the timing belt 10. In addition, a high-priced material having a high oil resistance and a high thermal resistance is not required for the timing belt 10, thereby reducing production costs of the timing belt 10. Moreover, because the blow-by gas passage is formed in the case of the timing belt system, a separate apparatus for recirculating the blow-by gas may be eliminated, and fuel efficiency may be improved.

For convenience in explanation and accurate definition in the appended claims, the terms “upper”, “lower”, “inner” and “outer” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A timing belt system for a vehicle, including a camshaft timing gear, a crankshaft timing gear, a timing belt which connects the two timing gears to each other so as to synchronize rotations of the two timing gears, and a tensioner which adjusts tension of the timing belt, the timing belt system comprising:

a case which has one side formed in an opened container shape, and is provided to cover the crankshaft timing gear, the camshaft timing gear, the timing belt, and the tensioner from a rear side direction; and a front side plate which is formed in a plate shape, and coupled to the case from a front side direction so as to close one open side of the case, wherein a blow-by gas passage, which recirculates blow-by gas, is formed in the case, and wherein a coolant passage, which is enclosed by a rear side plate, an outer wall and an inner wall of the case and the front side plate, is formed between the outer wall and the inner wall of the case so that a coolant is circulated therethrough.

2. The timing belt system of claim 1, wherein:

the rear side plate of the case is formed to block rear sides of the crankshaft timing gear, the camshaft timing gear, the timing belt, and the tensioner, the outer wall of the case vertically protrudes from the rear side plate along a circumference of the rear side plate, and the inner wall of the case vertically protrudes from the rear side plate along the circumference of the rear side plate at a portion relatively further inward from the circumference of the rear side plate than the outer wall.

3. The timing belt system of claim 2, wherein the crankshaft timing gear, the camshaft timing gear, the timing belt, and the tensioner are disposed in an internal space which is enclosed by the rear side plate, the inner wall, and the front side plate.

4. The timing belt system of claim 1, wherein a coolant inlet through which the coolant flows in, and a coolant outlet through which the coolant is discharged are formed in the coolant passage, and wherein a partition wall is formed between the coolant inlet and the coolant outlet so that the coolant is circulated in one direction.

5. The timing belt system of claim 1, wherein the coolant inlet and the coolant outlet are formed to be adjacent to each other so that the coolant is circulated along an entire circumference of the case, and wherein the partition wall is formed to isolate the coolant inlet and the coolant outlet from each other.

6. The timing belt system of claim 2, wherein the blow-by gas passage is formed along the circumference of the case such that the outer wall vertically protruding from the rear side plate is bent twice, thereby having a U-shaped cross section.

7. The timing belt system of claim 6, wherein a lower side of the blow-by gas passage is connected to a crank chamber, and an upper side of the blow-by gas passage is connected to an intake manifold such that the blow-by gas flowing into the crank chamber is transmitted to the intake manifold.

8. The timing belt system of claim 1, wherein a drain hole is formed in the case so that engine oil flowing into a space enclosed by the case and the front side plate is discharged.

* * * * *